March 18, 1969  F. N. DEIGAARD ET AL  3,433,005

HEDGE TRIMMING MACHINE

Filed Dec. 3, 1965  Sheet 1 of 3

INVENTORS
FRANK N. DEIGAARD
ARTHUR W. OLSON
BY
Salvatore G. Militana,
attorney

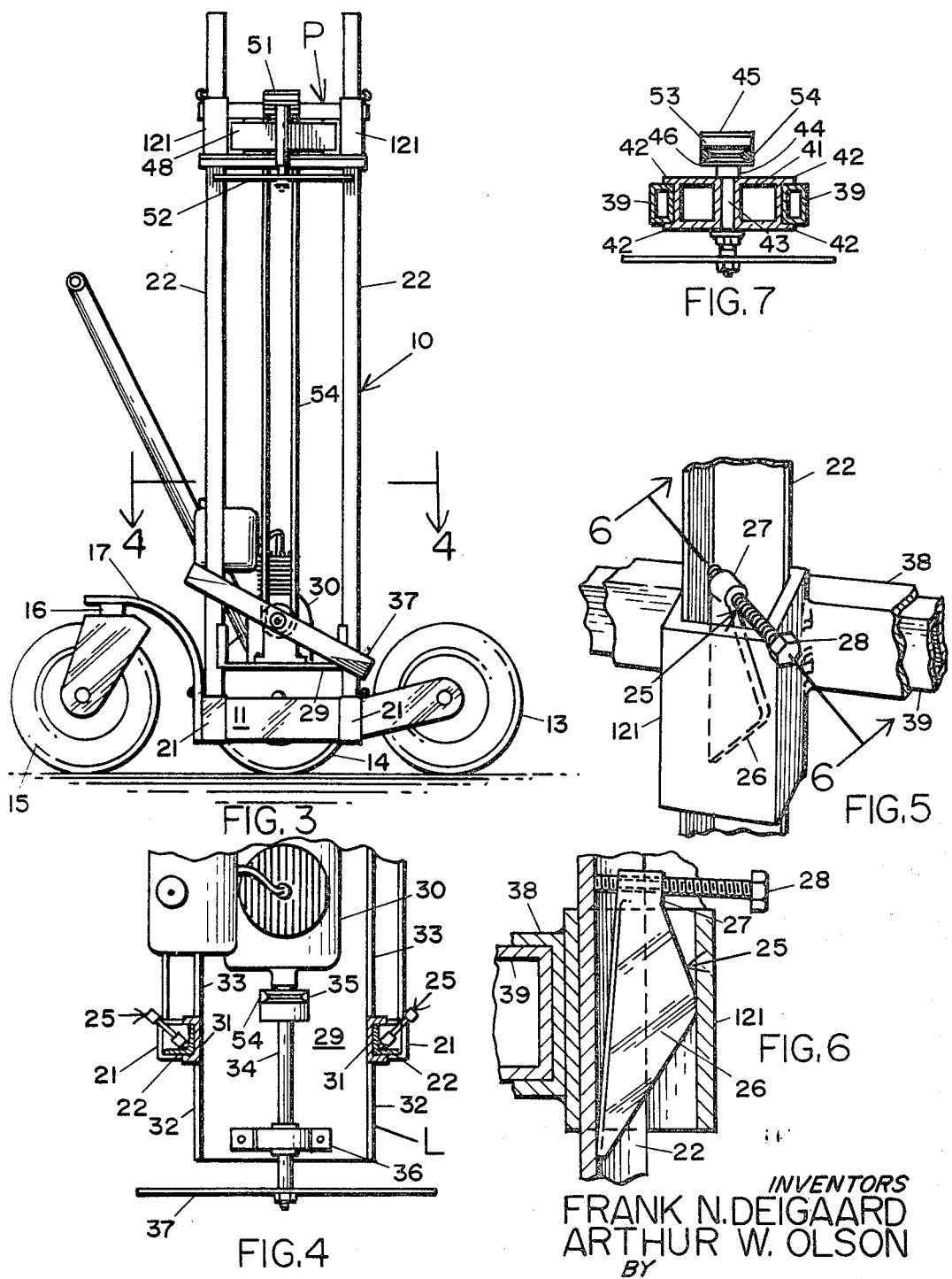

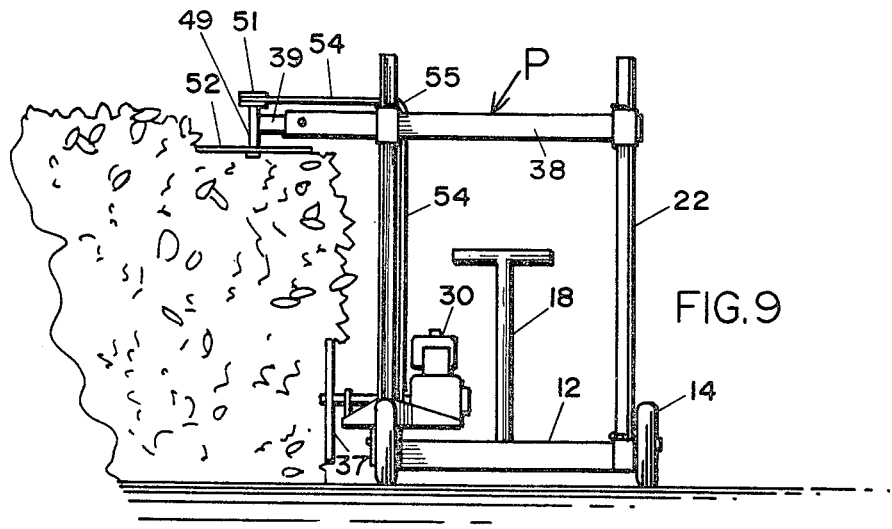
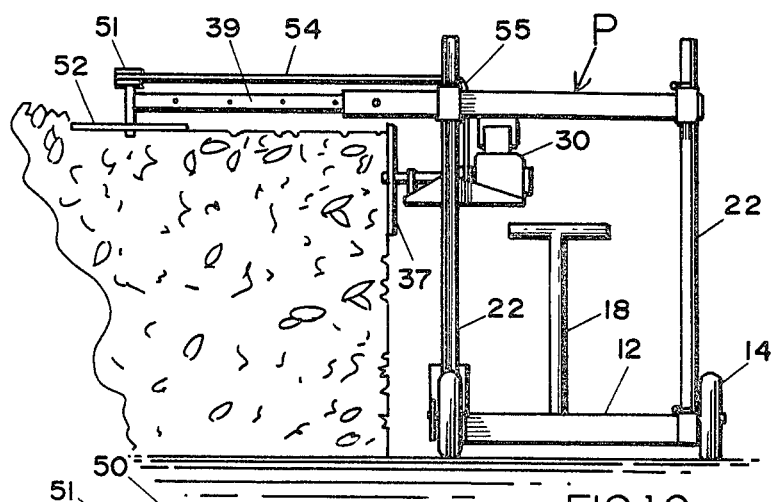
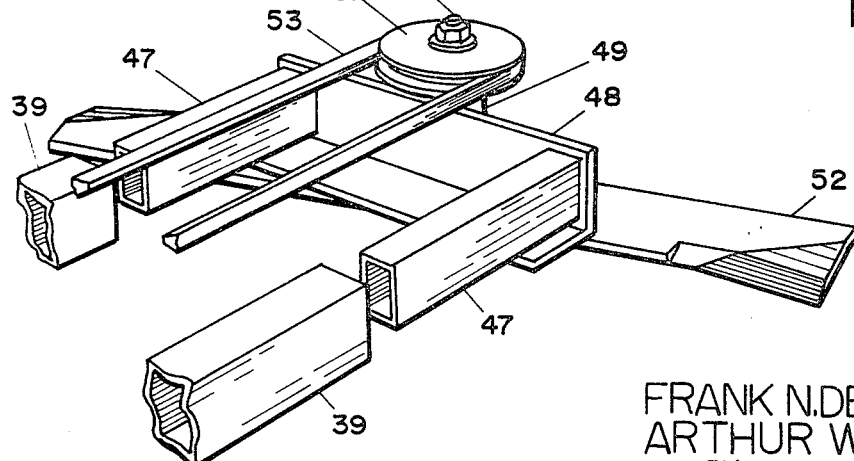

United States Patent Office 3,433,005
Patented Mar. 18, 1969

3,433,005
HEDGE TRIMMING MACHINE
Frank N. Deigaard, 4523 SW. 64th Ave. 33155, and
Arthur W. Olson, 8575 SW. 52nd Ave. 33143, both of
Miami, Fla.
Filed Dec. 3, 1965, Ser. No. 511,509
U.S. Cl. 56—235
Int. Cl. A01d 55/18, 55/26
2 Claims

ABSTRACT OF THE DISCLOSURE

A hedge trimming machine having a frame mounted on wheels with a pair of upright support members mounted on the frame slidably supporting a lower platform on which a hedge cutter and motor are mounted. An upper platform on the upright support members and slidable in a horizontal direction with a second hedge cutter mounted on the upper platform; the two cutters being engaged by an endless belt for powering the cutters and permitting the movement of the lower platform a distance equal to the movement of the upper platform.

---

This invention relates to machines for trimming hedges and is more particularly directed to such a machine which trims the top and side of the hedge simultaneously.

A principal object of the present invention is to provide a hedge trimming machine with two cutters having a single source of power operating the cutters to trim the top and side of the hedge simultaneously.

Another object of the present invention is to provide a hedge trimming machine having side and overhead cutters connected together and with a single source of power by a pulley system whereby a simple and economic manner of trimming a high hedge is effectuated.

A further object of the present invention is to provide a hedge trimming machine having a pair of cutters for simultaneously cutting the top and side of the hedge with a simple arrangement of pulleys and an endless belt whereby upon completion of a swath cut along the top and side of the hedge, movement of the top hedge cutter to a second position will move the side hedge cutter simultaneously for cutting further swaths along the hedge.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 3 is a side elevational view.

FIGURE 4 is a fragmentary cross sectional view taken along the line 4—4 of FIGURE 3.

FIGURE 5 is a fragmentary perspective view of the support structure for the overhead hedge cutter.

FIGURE 6 is a cross sectional view taken along the line 6—6 of FIGURE 2.

FIGURE 7 is a cross sectional view taken along the line 7—7 of FIGURE 1.

FIGURE 8 is an exploded view illustrating the manner of mounting the overhead cutter.

FIGURE 9 is a view similar to FIGURE 1 showing a hedge being trimmed during its initial cut.

FIGURE 10 is a similar view of the hedge and our hedge trimming machine after the cutters have been moved.

Figure 1:
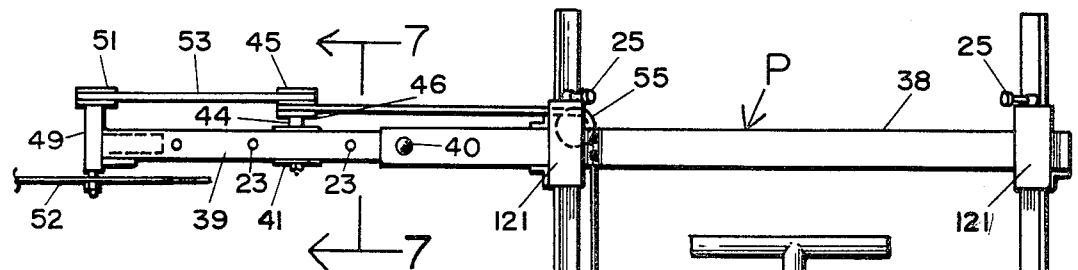
FIGURE 1 is a front elevational view of a hedge trimmer constructed in accordance with our invention.
Figure 2:
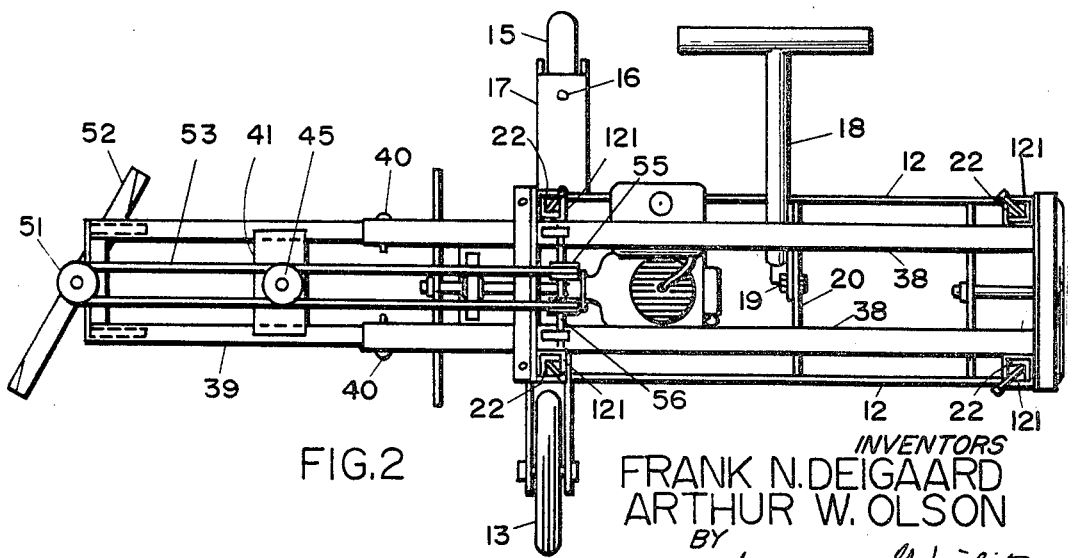
FIGURE 2 is a top plan view.

Referring to the drawings wherein like numerals are used to designate similar parts throughout the several views, the numeral 10 refers to a hedge trimming machine constructed in accordance with our invention, and consisting of two pairs of tubular support members 11 and 12 welded at their ends to form a support frame to which ground engaging wheels 13, 14 and 15 are mounted to permit movement of the machine 10 over the ground. While the wheels 13 and 14 are rotatably secured to the support frame 11, 12 for movement in a straight line with relation to the machine 10, the rear wheel 15 is secured to rotate about a swivel 16 fastened to the tubular frame members 11 by a yoke 17. A handle 18 is pivotally mounted as at 19 at one end to a cross brace 20 extending between the tubular frame members 12, thereby permitting the machine 18 to be drawn forwardly or rearwardly as desired.

Mounted at each of the four corners of the support frame 11, 12 is a relatively short length of a rectangular tubular member 21 positioned vertically for receiving angle members 22 that extend upwardly of the machine 10 upon which members 22 a platform P is secured.

The upright angle members 22 may be secured permanently as by welding to the tubular support members 21, but is in this instance made removable by the use of lock wedges 25 which are also used to lock the platform P at the tubular support members 121 to the upright angle members 22 as best shown by FIGURES 5 and 6.

The lock wedges 25 consist of a triangular shaped body portion 26 which fits loosely within the tubular members 121 (21) engaging the upright angle member 22. At one end of the body portion 26 is a neck portion 27 which is provided with a threaded bore for receiving a bolt 28. When the bolt 28 is threaded tightly to engage the angle member 22, the tubular members 21, 121 will be secured tightly against movement on the angle members 22. To disengage the members 22 and 21 (121) at all that need be done is loosen the bolt 28 which will disengage the body portion 26 from engagement with the tubular member 21 (121).

While the upper platform P is normally secured against movement on the upright angle members 22, the lower platform L is in floating position on the angle members 22. The lower platform L consists of a floor 29 on which an internal combustion engine 30 is mounted, although any source of power may be used such as an electric motor. Along the sides of the floor 29 are a pair of U-shaped guide members 31 slidably mounted along the uprights 22. To strengthen the platform 29, tapering side walls 32, 33 are welded to the floor portion 29.

Extending outwardly of the engine 30 is the drive shaft 34 on which there is mounted a combined flywheel and pulley 35. The drive shaft 34 that is journalled as at 36 to the platform L extends beyond the end of the floor portion 29 where a cutting blade 37 is secured to rotate and cut the side of the hedge.

The upper platform P is formed of a pair of rectangular tubular members 38 welded to the inner sides of the tubular support members 121 and with appropriate cross braces making the platform P vertically slidable on the upright angle members 22. With the use of the lock wedges 25 as explained hereinabove, the platform P may be secured at any desired height on the uprights 22.

Telescopically mounted in each of the tubular members 38 is a smaller but snugly fitting extension tubular member 39 which extends outwardly of the ends of the tubular members 38. The tubular members 39 are secured in position against sliding movement in the tubular members 38 by a pin 40 which extends through matching openings 23 in the tubular members 38 and 39. Slidably supported between the tubular members 39 is a pulley support 41 having spaced apart flange members 42 engaging the tubular members 39 as best seen in FIGURE 7. The pulley support 41 is provided with a centrally disposed bore 43 for receiving a shaft 44 on one end of which is mounted a pair of pulleys 45 and 46 that rotate in unison.

At the free end of the tubular members 39 there is mounted a cutting blade support consisting of a pair of tubular members 47 telescopically received at the open end of the tubular members 39. See FIGURE 8. An angle member 48 extends across the front ends of the members 47 securing the members 47 together and having a shaft support 49 mounted thereon. A shaft 50 which is rotatably mounted in the shaft support 49 is provided with a pulley 51 at one end and a cutting blade 52 secured to the lower end. An endless belt 53 is engaged at its end loops by the pulleys 51 and 45 while the pulleys 46 and 35 are engaged by the end loops formed on the endless belt 54. At the midportion of the endless belt 54 where the belt 54 changes from a vertical to a horizontal position, there is a pair of pulleys 55 rotatably mounted on a shaft 56 whose ends are fastened to the tubular members 38 in vertical alignment with the pulley 35 and in horizontal alignment with the pulley 46.

In the normal operation of our hedge trimming machine 10, the machine is pulled by the handle 18 alongside a hedge as best shown by FIGURE 9. The extension members 39 will have been slid inwardly of the tubular members 38 and locked in the desired position while the pulley support 41 will have been removed from the machine 10 in order that the lower cutter 37 is positioned close to the ground while the upper cutter 52 is at its closest position to the machine 10. Only the endless belt 54 is being used as the belt 53 is removed and the belt 54 engaging the pulleys 35, 55 and 51. The engine 30 is started and the cutting blades 37 and 52 will rotate to trim the hedge. The machine 10 is pulled along the hedge until the complete length of the hedge has been trimmed from one end to the other. When the end of the hedge has been reached, the pins 40 are removed and the extension members 39 are pulled outwardly of the tubular members 38 a distance approximately equal to the witdh of the swath being cut by the cutting blades 37 and 52. The pins 40 are then replaced in the openings from which they were removed, the matching bores 23 receiving the pins 40 to lock the extension members 39 and the blade support 49 in place.

As the extension members 39 were pulled outwardly, the endless belt 54 caused the floating platform L to slide upwardly on the upright members 22. The platform L along with the lower cutting blade 37 will have moved upwardly a distance equal to that distance which the upper cutter 53 was moved when the extension members 39 were slid outwardly of the tubular members 38. Now the cutters 37 and 52 will cut another swath on the side and top of the hedge.

This cycle of operation is repeated until the entire side and top of the hedge has been trimmed. If the hedge is larger in dimension in its width than its height, then pulley support 41 is replaced on the extension members 39 and the endless belt 53 added to the machine as shown by FIGURE 1.

Having disclosed our invention, what we claim as new and desire to secure by Letters Patent of the United States is:

1. A hedge trimming machine comprising a frame structure, a plurality of wheels supporting said frame structure, a plurality of upright members mounted on said frame structure, a lower platform slidably mounted along said upright members, power operated means mounted on said lower platform, a rotatable shaft extending outwardly of said lower platform, hedge cutting means secured to the free end of said rotatable shaft for cutting a hedge in a vertical plane, an upper platform slidably mounted along said upright members, locking means securing said upper platform to said upright members, cutter support means slidably mounted on said upper platform in a substantially horizontal plane, means removably securing said support means and said upper platform, hedge cutting means mounted on said cutter support means for cutting said hedge in a horizontal plane and an endless belt connecting said first named and second named cutting means for simultaneous cutting of the top and side of said hedge and upon sliding said upper cutter support means on said upper platform a certain distance, said lower platform is moved along said uprights a substantially equal distance.

2. The structure as recited by claim 1 wherein said locking means comprises a substantially triangular shaped body portion, a neck portion mounted at one end of said body portion, said neck portion having a threaded bore and a bolt threadedly received by said threaded bore.

References Cited

UNITED STATES PATENTS

| 693,159 | 2/1902 | Rumbarger | 287—58 |
| 1,869,394 | 8/1932 | Sikma | 56—235 |
| 2,798,354 | 7/1957 | O'Brien et al. | 56—236 |

FOREIGN PATENTS

| 176,434 | 5/1886 | France. |

ABRAHAM G. STONE, *Primary Examiner.*

PASQUALE A. RAZZANO, *Assistant Examiner.*

U.S. Cl. X.R.

313—87